(12) United States Patent
Jefferies et al.

(10) Patent No.: US 10,230,198 B2
(45) Date of Patent: Mar. 12, 2019

(54) EVSE ENERGY MANAGEMENT SYSTEM RETROFIT COUPLING

(71) Applicant: Schneider Electric USA, Inc., Andover, MA (US)

(72) Inventors: Kevin M Jefferies, Raleigh, NC (US); Benjamin W Edwards, Rolesville, NC (US); Matthew L White, Cary, NC (US); Konstantin Alexander Filippenko, Grenoble (FR); Richard Karl Weiler, Wake Forest, NC (US)

(73) Assignee: Schneider Electric USA, Inc., Andover, MA (US)

( * ) Notice: Subject to any disclaimer, the term of this patent is extended or adjusted under 35 U.S.C. 154(b) by 70 days.

(21) Appl. No.: 15/279,567

(22) Filed: Sep. 29, 2016

(65) Prior Publication Data

US 2018/0086213 A1 Mar. 29, 2018

(51) Int. Cl.
| | |
|---|---|
| *H02J 7/00* | (2006.01) |
| *H01R 13/66* | (2006.01) |
| *H01R 13/627* | (2006.01) |
| *H01R 31/06* | (2006.01) |
| *B60L 11/18* | (2006.01) |
| *H01R 107/00* | (2006.01) |

(52) U.S. Cl.
CPC ........ *H01R 13/6691* (2013.01); *B60L 11/184* (2013.01); *B60L 11/1838* (2013.01); *H01R 13/6272* (2013.01); *H01R 13/6683* (2013.01); *H01R 31/065* (2013.01); *B60L 2230/16* (2013.01); *H01R 2107/00* (2013.01); *H01R 2201/26* (2013.01)

(58) Field of Classification Search
USPC .......................................... 320/107, 108, 109
See application file for complete search history.

(56) References Cited

U.S. PATENT DOCUMENTS 8,509,976 B2 * 8/2013 Kempton ............ B60L 11/1824
701/22
8,731,730 B2 5/2014 Watkins et al.
(Continued)

OTHER PUBLICATIONS

"Smart Charger Controller simplifies electric vehicle recharging (w/Video)", Pacific Northwest National Laboratory, Aug. 30, 2009, http://phys.org/news/2009-04-smart-charger-electric-vehicle-recharging.html, downloaded Sep. 26, 2016, 4 pages.
(Continued)

*Primary Examiner* — Brian Ngo
(74) *Attorney, Agent, or Firm* — Locke Lord LLP

(57) ABSTRACT

An adapter which can be retrofit onto the downstream end of a standard Electric Vehicle Supply Equipment connector is used to control power consumption of an Electric Vehicle charging facility by intercepting the Control Pilot Signal going to the Electric Vehicle and issuing a new Control Pilot Signal to the Electric Vehicle which is particularly tailored for the present use, requirements and limitations of the delivery system capability. The adapter has wireless communication capability, requires no wiring to and from the Electric Vehicle Supply Equipment, is independent of any proprietary designs of the Electric Vehicle Supply Equipment and adds no constraints or requirements to the Electric Vehicle Supply Equipment.

2 Claims, 6 Drawing Sheets

(56) References Cited

U.S. PATENT DOCUMENTS

| | | |
|---|---|---|
| 8,796,881 B2 | 8/2014 | Davis |
| 2011/0010043 A1 | 1/2011 | Lafky |
| 2011/0202217 A1* | 8/2011 | Kempton ............ B60L 11/1824 |
| | | 701/22 |
| 2013/0026986 A1 | 1/2013 | Parthasarathy et al. |
| 2013/0169226 A1* | 7/2013 | Read ....................... B60L 11/16 |
| | | 320/109 |
| 2014/0211345 A1 | 7/2014 | Thompson et al. |
| 2014/0214459 A1 | 7/2014 | Ryder et al. |
| 2016/0137082 A1* | 5/2016 | Jefferies .............. B60L 11/1818 |
| | | 320/109 |
| 2016/0297315 A1* | 10/2016 | Gonzalez .............. G07F 15/005 |

OTHER PUBLICATIONS

"SAE J1772" from Wikipedia, https://en.wikipedia.org/wiki/SAE_J1772, downloaded Sep. 26, 2016, 10 pages.

"Charging—what can be more simple?", SAE International, 15 pages.

Pratt, R., "Vehicle Communications and Charging Control", Pacific Northwest National Laboratory, Project ID# VSS142, 23 pages.

\* cited by examiner

EVSE ENERGY MANAGEMENT SYSTEM RETROFIT COUPLING

BACKGROUND OF THE INVENTION

1. Field of the Invention

The present invention relates to Electric Vehicle Supply Equipment (EVSE) charging of Electric Vehicles (EVs). More particularly the present invention relates to the management of energy offered by EVSEs to the EVs through an existing charging infrastructure without the need for changing the existing infrastructure.

2. Discussion of the Related Art

With the growth of Electric Vehicle (EV) popularity infrastructure is constantly being added to charge the vehicles. In EVSE charging the Electric Vehicle adjusts its battery management system in response to the Control Pilot Signal. Maximum charging power is limited in the SAE J1772 protocol by the J1772 Control Pilot Signal and the battery management system charges the battery with the battery's safe operating envelope limited by the Control Pilot Signal.

A majority of Electric Vehicle charging is residential charging which happens at a driver's home where there may be one, or a limited number of, chargers (EVSE connectors). Other charging is considered "opportunity" charging, i.e. charging in public spaces such as parking lots at shopping centers, in city centers, and at work places. This charging infrastructure involves at least two aspects, installation of EVSEs, and installation of the power distribution for the EVSEs.

As the number of EVSE installations grows, utilities and energy providers are increasingly concerned over the distribution network capacity as well as their cost of the peak loads. The most efficient power generation plants are designed for a base load (coal, nuclear, etc.) and are very difficult to adapt to the variability of demand throughout a day, especially in regions of high air conditioning use. For those times of high demand, much less efficient and hence more costly supplemental peak power plants are used (mostly gas turbine). Sometimes utilities pass this cost to end users more directly through dynamic pricing based on demand. Two problems may exist: 1) the ability of the utility and its power distribution network to deliver the energy, and 2) the cost associated with the peaks of the energy production.

When designing an EVSE installation, the specifying engineer determines the capacity for the electrical distribution system based on the potential EVSE load. In the United States, the National Electric Code (NEC) allows the option for an energy management system because, without an energy management system, the service providing power to the EVSE installation must have capacity for providing power to all downstream EVSEs at maximum load simultaneously. However, if an energy management system is used, the service may have a lower capacity because the energy management system can prevent the EVSE charging load from exceeding the capacity of the installation. Currently available energy management systems add cost by requiring additional capabilities in the individual EVSEs. The available energy management systems also entail EVSE manufacturer selection limitations, due to the constraint of necessary compatibility between the energy management system and the proprietary EVSE designs.

For a significant portion of opportunity charging EVSE installations, the total system capacity is already set based on the originally installed EVSE charging system. With the continued adoption of EVs, the need will increase for a solution to allow simultaneous charging of more vehicles, with minimum impact on the installation infrastructure. Thus, it would be desirable to increase the available charging ports of an opportunity charging EVSE installation without requiring an increased system capacity, and without requiring modification of the installed infrastructure upstream of the EVSEs.

A somewhat different set of concerns is involved in residential Electric Vehicle charging. Over the last few years utilities and energy providers have installed many "smart" meters" in households to be able to, amongst other things, communicate to devices inside of the home and shed some of the loads. These can be dynamic changes like lowering of "smart" thermostat settings or complete turn off of loads like "smart" pool pumps. This allows control of energy consumption peaks and shifting some loads to a later time thus reducing need for costly peak generation. Similarly end users can control such "smart" devices in their home to reduce their energy cost when they are on a dynamic energy pricing model. It would be desirable to add such load control capability to any residential charging EVSE installation.

SUMMARY OF THE INVENTION

The invention allows an efficient solution to the above-discussed needs by creating an EVSE add-on, sometimes referred to herein as an "adapter" or a "retrofit coupling," that can turn any EVSE into a "smart" EVSE to help manage energy consumption. In a group installation of several "smart" EVSEs the add-ons communicating together would be able to keep the installation consumption under a set limit thus reducing the electrical installation cost at an opportunity charging site. Similarly, and usefully in most residential installations, such "smart" EVSE's can decrease the cost of energy through load shedding and shifting the consumption away from energy demand peaks.

To this end, aspects of the present invention provide an adapter which can be retrofit onto the downstream end of a standard EVSE connector, i.e. placed between the EVSE and the Electric Vehicle, which is used to intercept the Control Pilot Signal (CPS), which is an offer rate signal used to communicate the power available to the Electric Vehicle, and issue a new Control Pilot Signal to the Electric Vehicle. Because the invention is illustrated with the SAE J1772 protocol as an example the terms "control pilot signal" and "charge rate offer signal" and "offer signal" will be used interchangeably in the explanation. The new Control Pilot Signal can be dynamically adjusted based on a variety of information, including present use of the delivery system capacity, and can be particularly tailored for the present use, requirements, and limitations of the delivery system capability and the particular Electric Vehicle. The adapter has wireless communication capability, requires no wiring to and from the EVSE, is independent of any proprietary designs of the EVSE, and adds no constraints or requirements to the EVSE.

Some aspects of the present invention may provide retrofit coupling for an EVSE charging connector in an Electric Vehicle charging system using a standard protocol which can be retrofit downstream of the EVSE as a link between the EVSE and the Electric Vehicle to distribute available power in a power delivery infrastructure between multiple Electric Vehicle loads, or to control a single Electric Vehicle's load consumption, comprising: a) a body that fits onto the EVSE charging connector and Electric Vehicle receptacle, the body having: an input portion for accepting a standard EVSE charging connector and an output portion for fitting to a standard Electric Vehicle receptacle; the body further having: b) a wireless communications transceiver for communicating with energy providers and/or other retrofit couplings; c) Connection electronics to manage EVSE-to-retrofit coupling-to-Electric Vehicle connection protocol according to the standard, including a proximity measurement module to determine if the EVSE handle is attached to the retrofit coupling; a proximity circuit and a connector latch; to generate proximity signals from the retrofit coupling to the Electric Vehicle, and to establish a ground connection for the retrofit coupling; d) Offer electronics for determining a present power supply availability and a current Electric Vehicle demand; and dynamically controlling the charge rate offer of the EVSE, including: a current measurement module to measure how much current the Electric Vehicle is drawing; an Energy Management Controller for processing data within the retrofit coupling and sending instructions for new offer signal generation to an offer signal generator; an Upstream EVSE control pilot measurement and control module to read a charge rate offer signal coming from the EVSE and to report offer signal data to the Energy Management Controller, and a control pilot signal (CPS) generator module to generate the new offer signal, and send the new offer signal to the Electric Vehicle, according to a decision algorithm implemented by the Energy Management Controller which determines the charge rate offer to the Electric Vehicle using calculations based on at least one of an existing charge rate offer of the EVSE, the electrical capacity of the power delivery infrastructure, and the state of consumption of each adapter within the power delivery infrastructure, whereby; e) the offer signal at each retrofit coupling within a charging system may be dynamically controlled to the Electric Vehicles.

In other aspects the present invention can include a retrofit coupling for an EVSE charging connector comprising: a body that fits onto the EVSE charging connector and Electric Vehicle receptacle, the body having: an input for each connection point on the standard charge connector and a corresponding output connection point to the Electric Vehicle receptacle; the body further having: a wireless communications transceiver for communicating with the power supplier and/or other retrofit couplings; and electronics for interpreting current power supply availability and current Electric Vehicle demand; and dynamically controlling the offer of same, including: a current measurement module to measure how much the Electric Vehicle is drawing; an Energy Management Controller for processing data within the retrofit coupling; an Upstream EVSE pilot signal measurement and control module to read the control pilot signal coming from the EVSE, and report the Control Pilot Signal to the Energy Management Controller and send instructions for new Control Pilot Signal generation to the control pilot signal generator; a proximity measurement module to determine the EVSE handle is attached to the retrofit coupling; a control pilot signal generator module to generate and send a new Control Pilot Signal to the Electric Vehicle; a proximity circuit and a connector latch; to generate a proximity signal from the retrofit coupling to the Electric Vehicle, and to establish a ground connection for the retrofit coupling; whereby charging ability based on the power distribution network delivery capability and present usage may be dynamically controlled to the Electric Vehicle (s) by changing the control pilot signal at each retrofit coupling within a charging power delivery system.

In other aspects of the invention a method of controlling power from an Electric Vehicle Supply Equipment to an Electric Vehicle includes the steps of: attaching an retrofit coupling to a connector of the Electric Vehicle Supply Equipment; attaching the retrofit coupling to a receptacle of the Electric Vehicle; verifying the proximity signal; intercepting a control pilot signal of the Electric Vehicle Supply Equipment; intercept any charging-related information from the attached Electric Vehicle; wirelessly receiving and sending data on at least one of: Electric Vehicle current consumption, control pilot signals, and proximity measurements from all retrofit couplings, and wirelessly receiving data from an energy provider entity; and determining, configuring, and sending a new control pilot signal, and proximity signal, from the retrofit coupling to the Electric Vehicle.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION

As an initial matter, it will be appreciated that the development of an actual commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

The illustrated embodiment can be considered an overlay on a standard Electric Vehicle charging and connector system so it operates with every model of EVSE using that standard. It will of course be appreciated by the person of ordinary skill in the art that the invention is not limited to use with the SAE J1772 standard.

Figure 1:
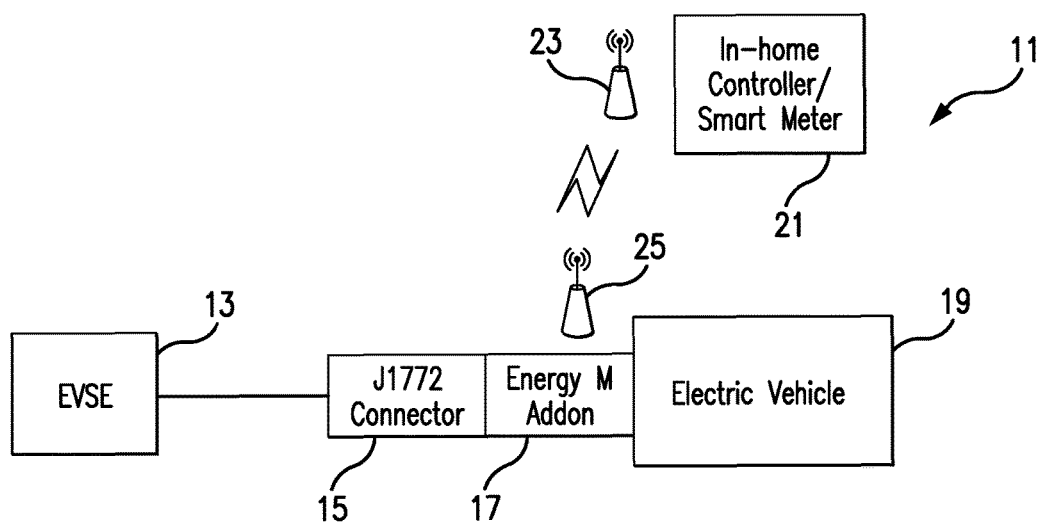
FIGS. 1 and 2 are schematic representations of residential charging and opportunity charging power delivery systems, respectively, utilizing the present invention.

FIG. 1 shows a residential Electric Vehicle (EV) charging infrastructure 11 including Electric Vehicle Supply Equipment (EVSE) 13 with a single corded connector handle 15 which could, for example be of the SAE J1772 standard type if located in the U.S.A. The connector 15 is attached to a retrofit coupling 17 of the present invention which is then attached to the Electric Vehicle 19 for controlling energy consumption during the charging of the Electric Vehicle. The residential charging infrastructure is equipped with a controllable in-home "smart" meter 21 which meters power to the residence and can communicate with the energy supply grid, as will be known, and further communicates wirelessly, as at antennae 23, specifically with an energy management system of the retrofit coupling 17, as at antennae 25. Other home power controller schemes besides the "smart" meter might be used.

Figure 2:
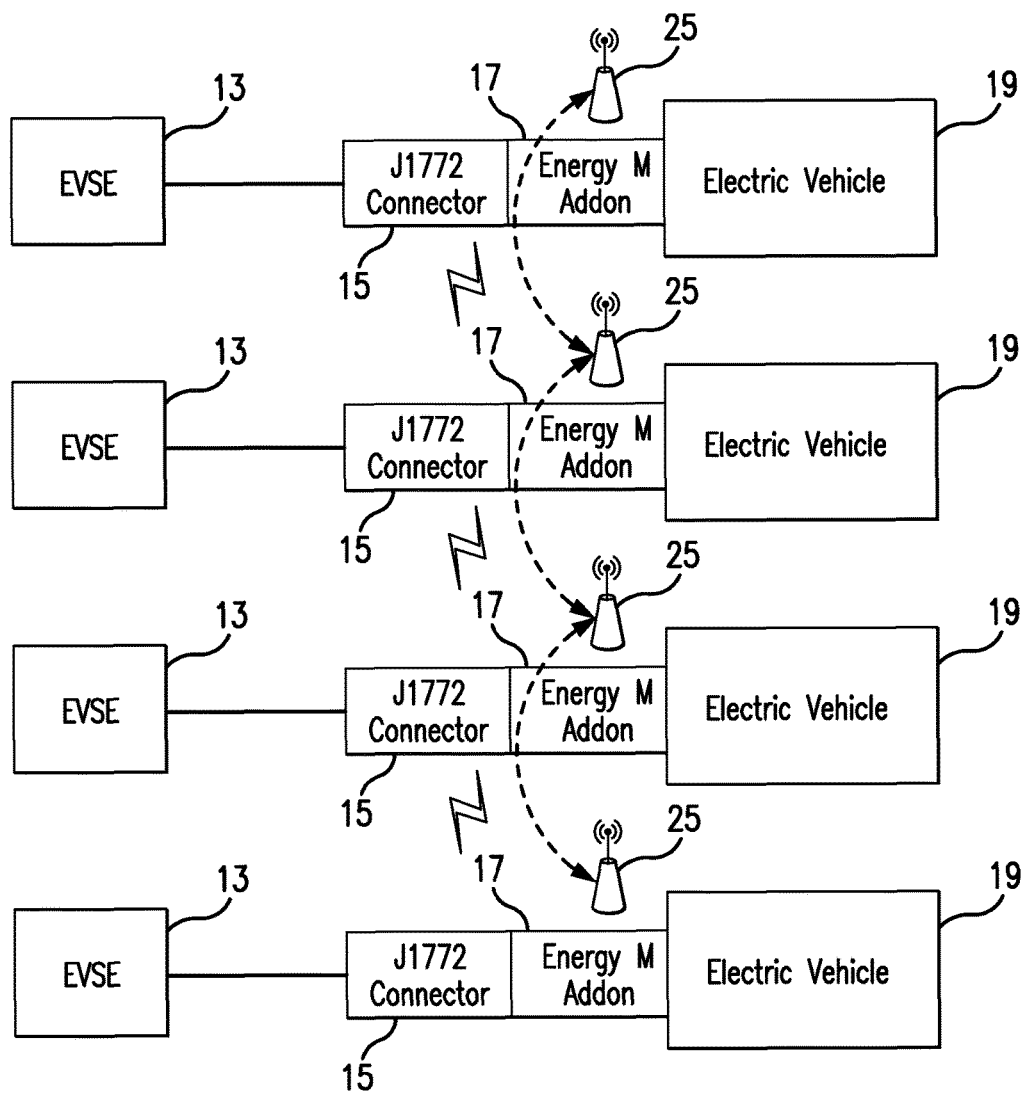

FIG. 2 shows an opportunity charging infrastructure 27 for a plurality of Electric Vehicles (EVs), collectively 19, including a plurality of EVSEs, collectively 13, each with a single corded connector handle collectively 15, although multiple cords or other designs of EVSE might be implemented. The connectors 15 are each attached to a retrofit coupling, collectively 17, of the present invention which are then attached to the individual EVs 19 for controlling energy consumption during the charging of the Electric Vehicle. As will be noted in the opportunity charging infrastructure 27 format, each retrofit coupling 17 communicates wirelessly with the other retrofit couplings as at antennae 25. In a group installation application such as this the Energy Management Controller inside of one of the couplings 17 might become the "master" to collect the information and help control the other adaptors. Alternatively, a distributed or non-deterministic control approach can be used. In this manner, total energy consumption for the infrastructure as well as other data can be collected and distributed, as further explained below.

Figure 3:
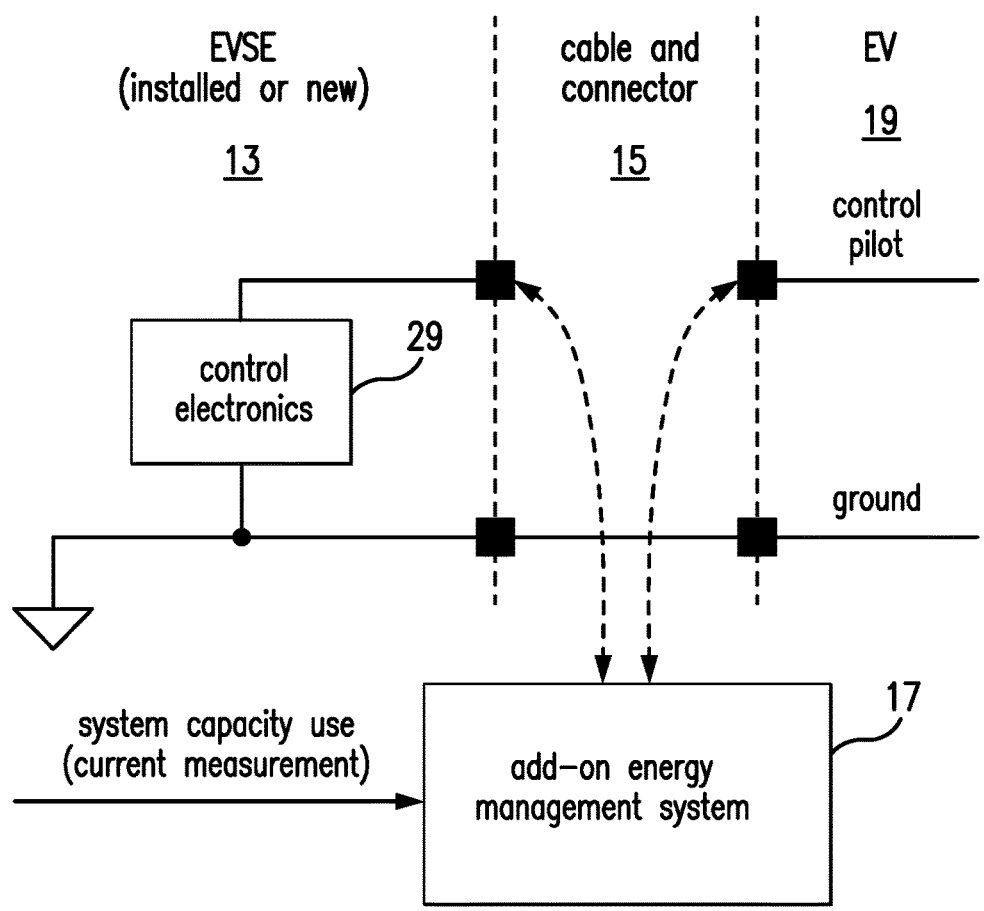
FIG. 3 is a schematic of the present invention in place between an EVSE and an Electric Vehicle.

FIG. 3 illustrates schematically a central operational detail of the present invention to have the retrofit coupling 17 placed between the charging control electronics 29 of the EVSE 13 and the Electric Vehicle 19 whereby it can intercept the signals of the EVSE and the Electric Vehicle and determine an appropriate energy management level according to the system capacity and use.

Figure 4:
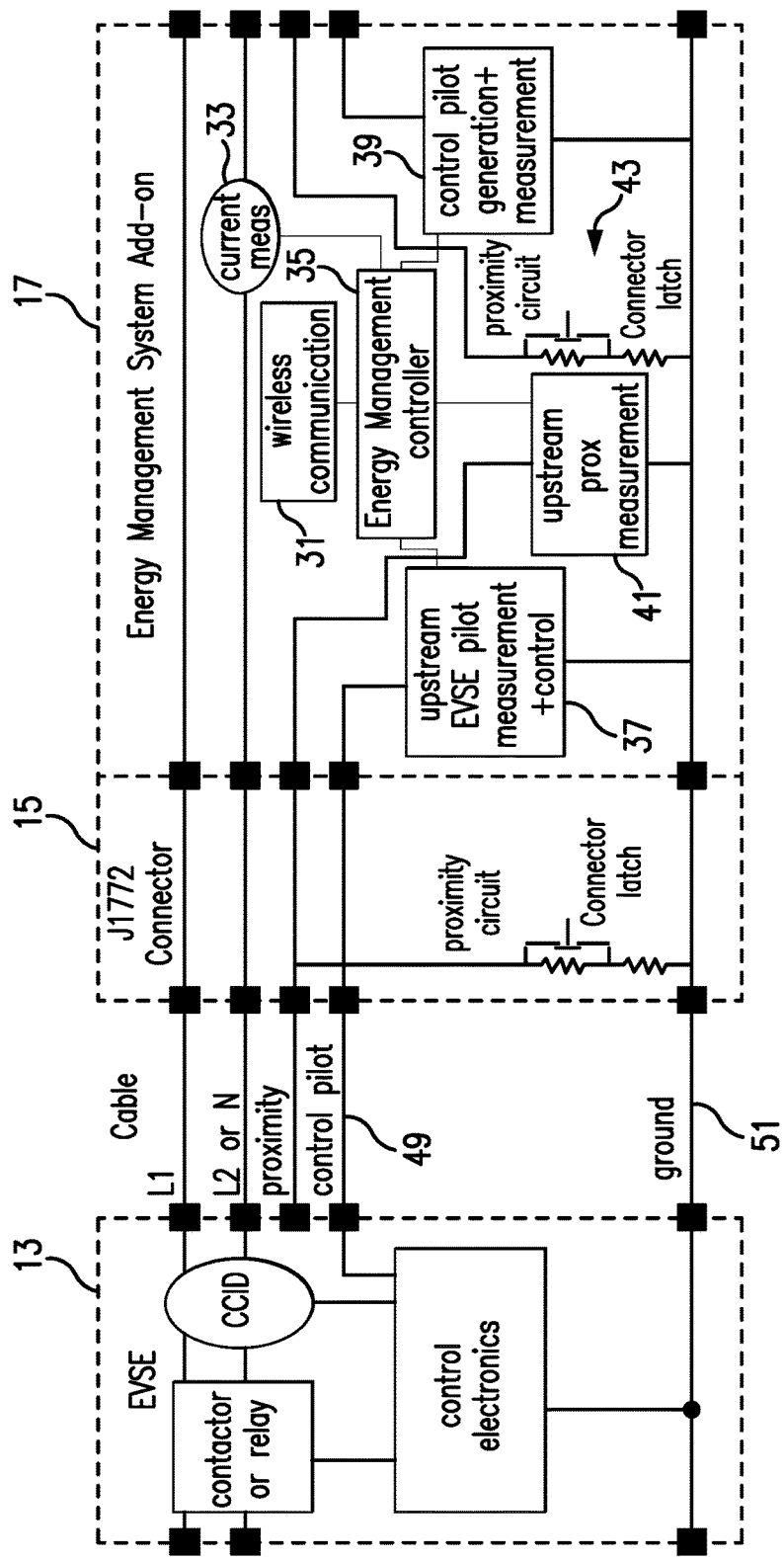
FIG. 4 is a more detailed schematic of the present invention in conjunction with an EVSE and an Electric Vehicle.
Figure 5:
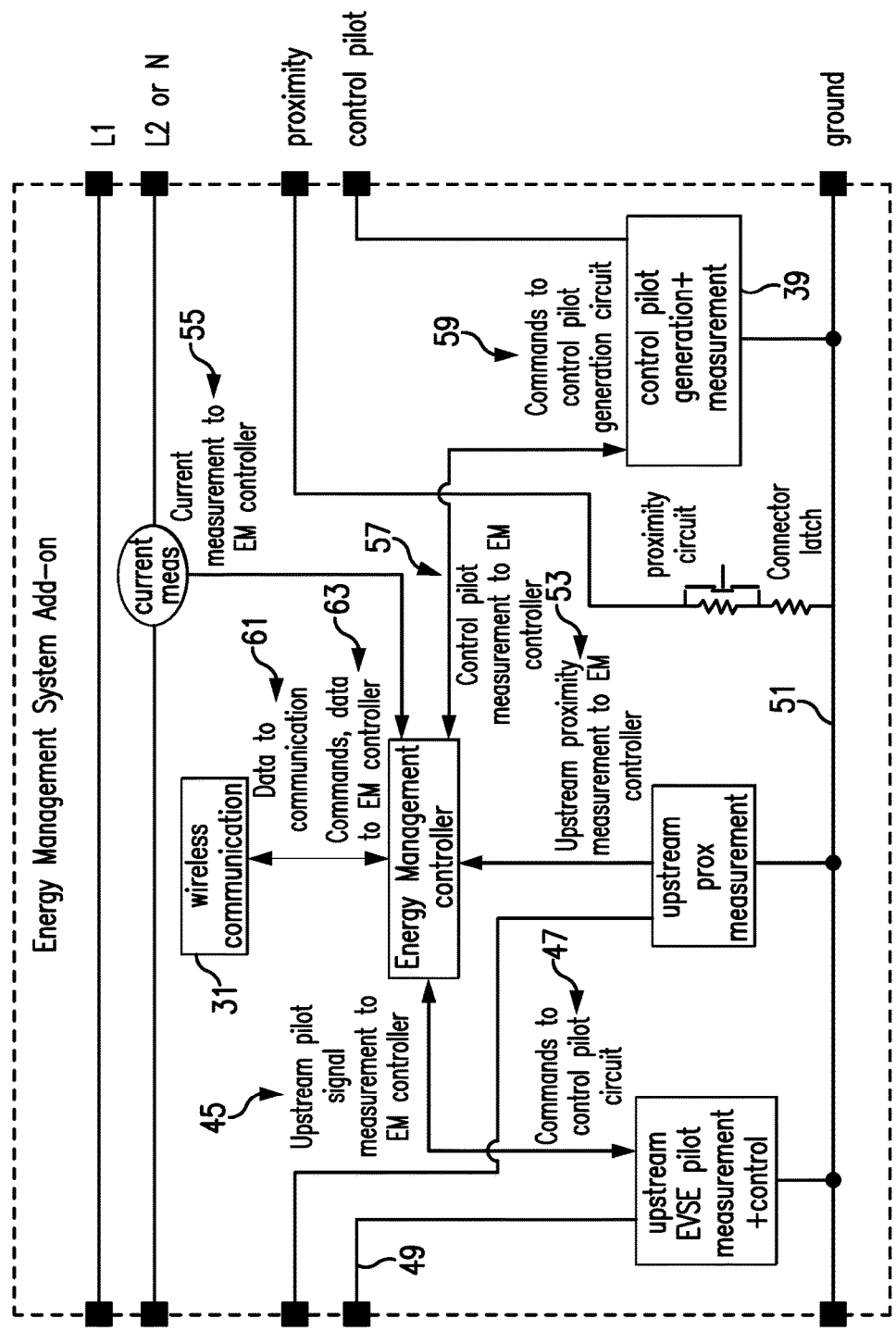
FIG. 5 is a chart of data and signals for the Energy Management System of the retrofit coupling.

FIG. 4 illustrates schematically the connection of the EVSE connector 15 to the retrofit coupling 17 having a box diagram of the electronics of the Energy Management System of the retrofit coupling therein. Included within the electronics of the retrofit coupling 17 are a wireless communications transceiver 31 for communicating with the energy supply grid, or various energy consumption controllers, and/or the other retrofit couplings; and the necessary electronics for interpreting current power supply availability and current Electric Vehicle demand; and dynamically controlling the offer of same. FIG. 5 illustrates the signal routing within the Energy Management System electronics of the retrofit coupling 17. It will be appreciated that the modules of the electronics are designated functionally and may of course be arranged in a variety of layouts. The electronics include: a current measurement module 33 provided on one of the energy carrying lines (here L2) to measure how much current the Electric Vehicle is drawing.

Also included is an Energy Management Controller 35 as a processor module provided for processing the data within the retrofit coupling; an Upstream EVSE pilot signal measurement and control module 37 provided to read the control pilot signal (CPS) coming from the EVSE and control the power request, and to report the Control Pilot Signal to the Energy Management Controller 35 and send instructions for new Control Pilot Signal generation to a control pilot signal generator 39 to generate and send a new Control Pilot Signal to the Electric Vehicle.

Also included is an proximity measurement module 41 provided to determine the EVSE handle is attached to the retrofit coupling. A proximity circuit and a connector latch 43; are provided to generate a proximity signal from the retrofit coupling to the Electric Vehicle, and to establish a ground connection for the retrofit coupling and maintain the ground connection throughout the vehicle charging circuit.

As seen in FIG. 5, signal routing will include Upstream pilot signal measurement 45 to the energy management controller. This tells the Energy Management Controller the state of the control pilot signal from the upstream EVSE, which includes the duty cycle informing the Energy Management Controller of the maximum charge rate offered by the upstream EVSE.

Further commands include commands 47 to the control pilot circuit 37 wherein the Energy Management Controller 35 issues commands to manipulate the control pilot signal in accordance with the charging standard (such as a J1772 interface), such as to request a charge from the upstream EVSE by connecting a specific resistance between the control pilot line 49 and ground 51, i.e. the same pilot signal is used to request power from the EVSE after it's analog level is modified by the Electric Vehicle and repeated back through the adapter.

An Proximity measurement signal 53 is sent to Energy Management Controller 35. This tells the Energy Management Controller 35 the state of the proximity circuit on the EVSE handle, in accordance with the standard interface, such as if the proximity switch is pressed and that the EVSE is well connected to the adapter.

A Current measurement signal 55 is sent to Energy Management Controller to tell the Energy Management Controller 35 the value of charging current drawn by the Electric Vehicle.

A Control pilot measurement 57 is sent to the 35 to tell the Energy Management Controller the state of the control pilot signal, in accordance with the standard interface, including if the connected Electric Vehicle is requesting charging current.

Commands to the control pilot generation circuit 59 are sent when the Energy Management Controller 35 issues commands to tell the control pilot generation circuit 39 what output to generate, such as the state of the control pilot signal and the duty cycle of the control pilot phase width modulated (PWM) signal, for example, as in accordance with the standard J1772 interface.

Data signals 61 are issued out to the wireless communication module 31 by the Energy Management Controller 35 which can send data including the status of the retrofit coupling 17 (e.g., charging, not charging), and data such as current measurement, the maximum charge rate offered by the upstream EVSE, and the charge rate being offered to the Electric Vehicle by the energy management system of the retrofit coupling 17.

Commands and data 63 into the Energy Management Controller give the Energy Management Controller 35 the data used to manage the energy management system of the retrofit coupling 17. For example, this data could include the number of active stations in a charging facility for a simple allocation scheme in which the available capacity is divided evenly, or the available system capacity in a scheme with current measurement, or a specific charge rate to offer in a scheme where another device manages the allocation of system capacity to the energy management system adapters.

The distribution algorithm could be changed among several schemes such as the following:

An example implementation of a first scheme is for each energy management system of the retrofit coupling device to divide the value of the entire system capacity by the number of EVs currently requesting charging current. The lesser of this value and the maximum charge rate offered by the upstream EVSE determines what charging current should be offered to the Electric Vehicle by the energy management system of the retrofit coupling and the appropriate duty cycle that the Energy Management Controller should command to the control pilot generation circuit.

In an alternate scheme, a decision algorithm implemented by the energy management electronics determines the charge rate offer that is offered by each retrofit coupling's control electronics, using calculation based on the charge rate offer of the existing installed EVSE, the state of each energy management system of the retrofit coupling, the setting for entire system capacity, and the charge rate consumption of each retrofit coupling.

An example implementation of the alternate scheme is for each energy management system of each retrofit coupling device to subtract from the system capacity the summed charge rate consumption of all retrofit coupling devices in the system providing charge. The lesser of this value and the maximum charge rate offered by the upstream EVSE determines what charging current should be offered to the Electric Vehicle. The current measurement function measures the charge rate consumption of the Electric Vehicle, which the Energy Management Controller communicates to the other retrofit coupling devices in the system using the communication function. If the charge rate consumption is less than the charge rate offer commanded by the Energy Management Controller to the control pilot generation circuit, the Energy Management Controller issues a new command to reduce the charge rate offer to equal the charge rate consumption.

In different connection scheme, a decision scheme can be implemented by the retrofit coupling control electronics which determines the charge rate that is offered by the control electronics using calculation based on the charge rate offer of the existing installed EVSE and the load shed demand coming from utility grid or station owner through the wireless transceiver. An example implementation of this scheme is for each energy management system of the retrofit coupling device to divide the value of the entire system capacity less the load shed demand by the number of EVs currently requesting charging current. The lesser of this value and the maximum charge rate offered by the upstream EVSE, determines what charging current should be offered to the Electric Vehicle by the energy management system of the retrofit coupling.

Figure 6:
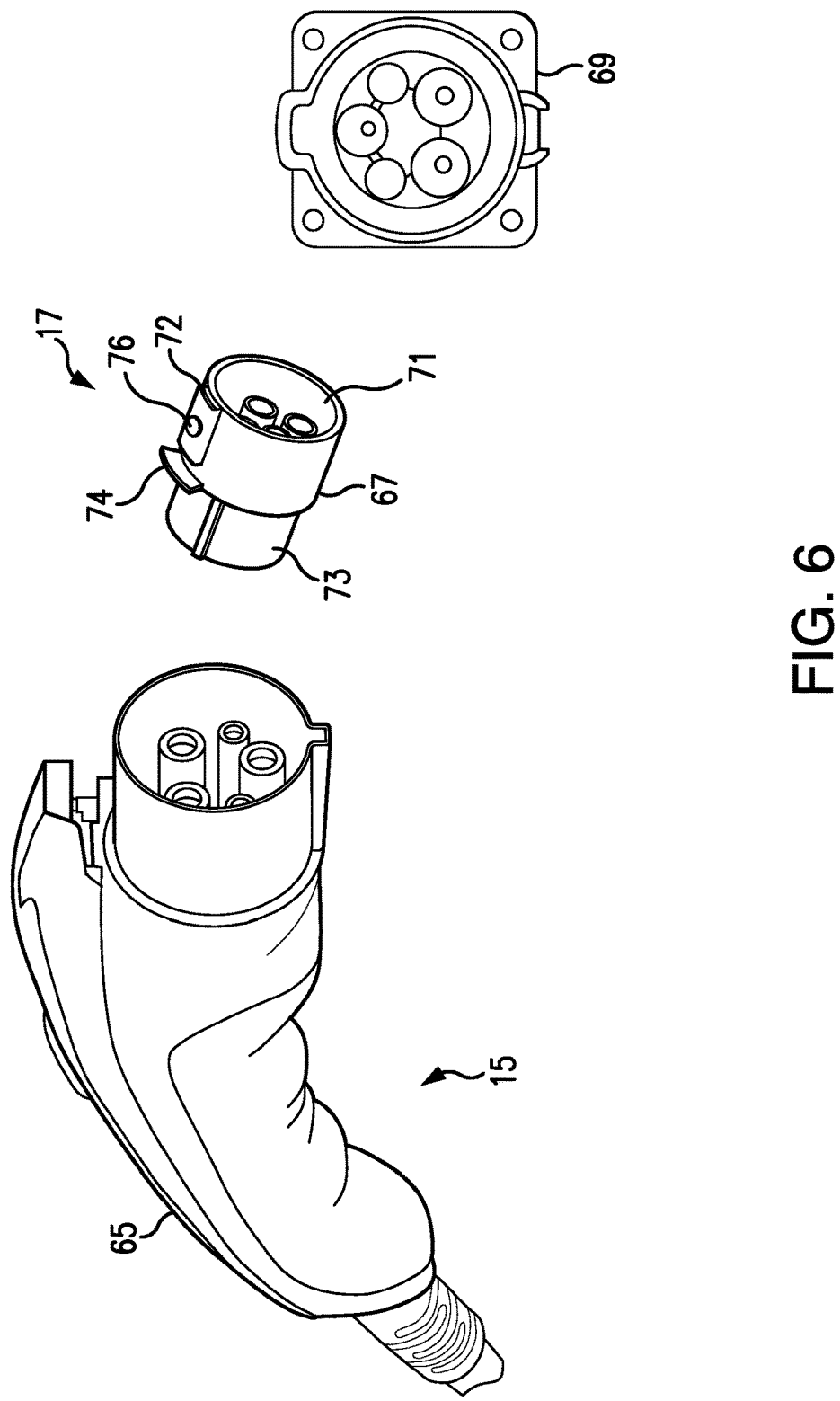
FIG. 6 shows one possible embodiment of a retrofit coupling for an EVSE charging connector placed between a charging handle on the EVSE side and a coupling port for the Electric Vehicle.

FIG. 6 shows one possible physical embodiment of the environment of the present invention in the form of an SAE J1772 connector handle 65 for the EVSE as an example of the single corded connector 15; the corresponding receptacle 69 of an Electric Vehicle (not shown), and the body 67 of the retrofit coupling 17 between the handle 65 and the receptacle 69.

As can be seen in this example, the retrofit coupling 17 may include a body having a generally cylindrical shaped adapter housing composed of a connector portion 71 and a socket portion 73. Each portion 71, 73 has the appropriate latch fitting 72, 74, respectively, for attachment and proximity detection/control with the connector portion 71 having a release button 76 for its latch fitting 72. The connector portion 71 is designed to be connected to the receptacle 69 of an Electric Vehicle while the socket portion 73 is designed to receive the EVSE connector 15. When assembled, the various portions allow the retrofit coupling 17 to fit and function in all relevant aspects the same way the EVSE connector 15 fits and functions in the Electric Vehicle socket 69 while also performing the energy management control functions. Other components housed within the retrofit coupling 17 may include a current transformer (not shown), that can fit within the generally cylindrical shape housing of the retrofit coupling 17 to sense the charging current flowing to the electric vehicle. As well, it will be appreciated that a printed circuit board (not shown) may be housed within the retrofit coupling 17 for electrically interconnecting the various electronic circuits, such as described above, to one another. Operating power may be tapped from the Control Pilot Signal in order to power the electronics and backup power may be provided by a battery if needed.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the invention as defined in the appended claims.

The invention claimed is:

1. A retrofit coupling for an Electric Vehicle Supply Equipment charging connector in an Electric Vehicle charging system using a standard protocol which can be retrofit downstream of the Electric Vehicle Supply Equipment as a link between the Electric Vehicle Supply Equipment and the Electric Vehicle to distribute available power in a power delivery infrastructure between multiple Electric Vehicle loads, or to control a single Electric Vehicle's load consumption, comprising:
  a) a body that fits onto the Electric Vehicle Supply Equipment charging connector and Electric Vehicle receptacle, the body having: an input portion for accepting a standard Electric Vehicle Supply Equipment charging connector and an output portion for fitting to a standard Electric Vehicle receptacle; the body further having:
  b) a wireless communications transceiver for communicating with energy providers and/or other retrofit couplings;
  c) Connection electronics to manage Electric Vehicle Supply Equipment-to-retrofit coupling-to-Electric Vehicle connection protocol according to the standard protocol, including a proximity measurement module to determine if a handle of the Electric Vehicle Supply Equipment is attached to the retrofit coupling; a proximity circuit and a connector latch; to generate proximity signals from the retrofit coupling to the Electric Vehicle;
  d) Offer electronics for determining a present power supply availability and a current Electric Vehicle demand; and dynamically controlling a charge rate offer of the Electric Vehicle Supply Equipment, including:
    i. a current measurement module to measure how much current the Electric Vehicle is drawing;

ii. an Energy Management Controller for processing data within the retrofit coupling and sending instructions for new offer signal generation to an offer signal generator;
iii. an Upstream Electric Vehicle Supply Equipment pilot measurement and control module to read a charge rate offer signal coming from the Electric Vehicle Supply Equipment, report offer signal data to the Energy Management Controller, and send a request charge command; and
iv. an offer signal generator module to generate a new offer signal, and send the new offer signal to the Electric Vehicle, according to a decision algorithm implemented by the Energy Management Controller which determines the charge rate offer to the Electric Vehicle using calculations based on at least one of an existing charge rate offer of the Electric Vehicle Supply Equipment, the electrical capacity of the power delivery infrastructure, or the state of consumption of each adapter within the power delivery infrastructure, whereby;
e) the offer signal to the Electric Vehicle at each retrofit coupling within a charging system may be dynamically controlled.

2. A method of controlling power from an Electric Vehicle Supply Equipment to an Electric Vehicle including:
attaching the retrofit coupling according to claim 1 to both a connector of the Electric Vehicle Supply Equipment and a receptacle of the Electric Vehicle such that the retrofit coupling is physically located between the Electric Vehicle Supply Equipment and the Electric Vehicle;
verifying a proximity signal;
intercepting a control pilot signal of the Electric Vehicle Supply Equipment;
intercepting any charging-related information from the attached Electric Vehicle, wirelessly receiving and sending data concerning at least one of Electric Vehicle current consumption, control pilot signals, or proximity measurements from all retrofit couplings, and wirelessly receiving data from an energy provider entity, and
determining, configuring, and sending a new control pilot signal, and proximity signal, from the retrofit coupling to the Electric Vehicle.

\* \* \* \* \*